US012644429B2

(12) United States Patent
Gao et al.

(10) Patent No.: US 12,644,429 B2
(45) Date of Patent: Jun. 2, 2026

(54) EVAPORATIVE EMISSIONS LEAK CHECK MODULE WITH VOC MEASUREMENT

(71) Applicant: Stoneridge Asia Pacific Electronics (Suzhou) Co. Ltd., Jiangsu (CN)

(72) Inventors: Xiao Wu Gao, Jiangsu (CN); Wen Tao Jiang, Jiangsu (CN); Yao Yu, Jiangsu (CN)

(73) Assignee: STONERIDGE ASIA PACIFIC ELECTRONICS (SUZHOU) CO. LTD., Jiangsu (CN)

( * ) Notice: Subject to any disclaimer, the term of this patent is extended or adjusted under 35 U.S.C. 154(b) by 0 days.

(21) Appl. No.: 18/999,073

(22) Filed: Dec. 23, 2024

(65) Prior Publication Data

US 2025/0215845 A1 Jul. 3, 2025

(30) Foreign Application Priority Data

Dec. 29, 2023 (CN) ......................... 202323663408.0

(51) Int. Cl.
*F02M 33/02* (2006.01)
*F02M 25/08* (2006.01)

(52) U.S. Cl.
CPC .... *F02M 25/0809* (2013.01); *F02M 25/0854* (2013.01)

(58) Field of Classification Search
CPC ........... F02M 25/0836; F02M 25/0818; F02M 25/0809; F02M 25/0854; B60K 15/03504; F02D 2041/225

(Continued)

(56) References Cited

U.S. PATENT DOCUMENTS 5,483,942 A 1/1996 Perry et al.
9,944,175 B2 4/2018 Weigl et al.

(Continued)

FOREIGN PATENT DOCUMENTS

CN 104564437 A 4/2015
CN 115199443 A 10/2022
CN 118574666 A 8/2024

OTHER PUBLICATIONS

Extended European Search Report for Application No. EP 24223102.5 dated Jun. 3, 2025.

*Primary Examiner* — Hung Q Nguyen
*Assistant Examiner* — James J Kim
(74) *Attorney, Agent, or Firm* — Carlon, Gaskey & Olds, P.C.

(57) ABSTRACT

A leak detection module may include a housing and a canister valve solenoid (CVS) arranged within the housing and in fluid communication along a first fluid passageway between canister and atmospheric ports. The leak detection module may include a second fluid passageway in parallel with the first fluid passageway and fluidly connected to the canister and atmospheric ports. A CVS check valve is arranged in the second fluid passageway and a volatile organic compound (VOC) gas sensor is arranged in one of the first and second passageways, configured to measure the concentration of hydrocarbons (HC) therethrough. A mass flow meter is arranged in one of the first and second passageways to determine a mass flow rate from the canister port to the atmospheric port. A controller measures the quality of the emissions by monitoring the HC and communicates the result to a base station.

5 Claims, 4 Drawing Sheets

(58) Field of Classification Search
USPC .......................................................... 123/519
See application file for complete search history.

(56) References Cited

U.S. PATENT DOCUMENTS

| | | | | |
|---|---|---|---|---|
| 10,151,265 | B2 | 12/2018 | Dudar | |
| 10,350,993 | B2 | 7/2019 | Mills | |
| 11,187,192 | B2 | 11/2021 | Peters et al. | |
| 11,649,787 | B1 * | 5/2023 | Dudar ................ | F02M 25/0809 123/519 |
| 11,651,631 | B2 | 5/2023 | Dudar | |
| 11,773,809 | B2 * | 10/2023 | Harriger ............... | G01M 3/025 73/114.39 |
| 12,163,494 | B2 * | 12/2024 | Dudar ................ | F02M 25/0854 |
| 2016/0084175 | A1 | 3/2016 | Dudar | |
| 2018/0209368 | A1 | 7/2018 | Dudar et al. | |
| 2023/0034896 | A1 | 2/2023 | Dudar | |
| 2023/0313762 | A1 | 10/2023 | Peters | |
| 2024/0175413 | A1 * | 5/2024 | Peters ................ | F02M 25/0836 |
| 2024/0247623 | A1 * | 7/2024 | Dudar ................ | F02M 25/0854 |

* cited by examiner

EVAPORATIVE EMISSIONS LEAK CHECK MODULE WITH VOC MEASUREMENT

CROSS REFERENCE TO RELATED APPLICATION

This application claims priority to Chinese Patent Application No. 2023236634080, filed on Dec. 29, 2023, and is incorporated herein by reference.

TECHNICAL FIELD

This disclosure relates to a leak detection module (LDM) for an evaporative emissions system. In one example, the disclosure relates to an LDM that is able to measure volatile organic compounds (VOC) and transmit results to remote locations.

BACKGROUND

Evaporative emissions systems have long been required for gasoline powered vehicles. The system must undergo a periodic leak test during or after a vehicle drive cycle to ensure that fuel vapors will not leak into the atmosphere. The gasoline engine, a pump, or fuel tank temperature change is used either to create a vacuum or pressurize the system. Various valves may be closed during this test procedure to maintain system pressure, and the pressure is monitored to determine if there are any leaks.

One type of evaporative emissions system uses a leak detection module (LDM) that typically houses a pump and one or more valves that are operated during a test procedure. Two two-way valves are commonly used in an LDM to regulate flow from the pump and relative to atmosphere.

Currently, CN VI vehicles are equipped with leakage inspection technology for evaporative emission control systems. Several diagnostic solutions that are widely used in the existing technology include vacuum attenuation, EONV, DMTL, ELCM and other methods, but they all require preliminary parts development based on the vehicle. Matching and data calibration cannot be directly applied to the CN IV and CN V fuel vehicles in the market. It is not possible to inspect the leakage of the fuel evaporation control system and the excessive emission of HC compounds from the carbon canister on the existing CN IV and CN V fuel vehicles.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
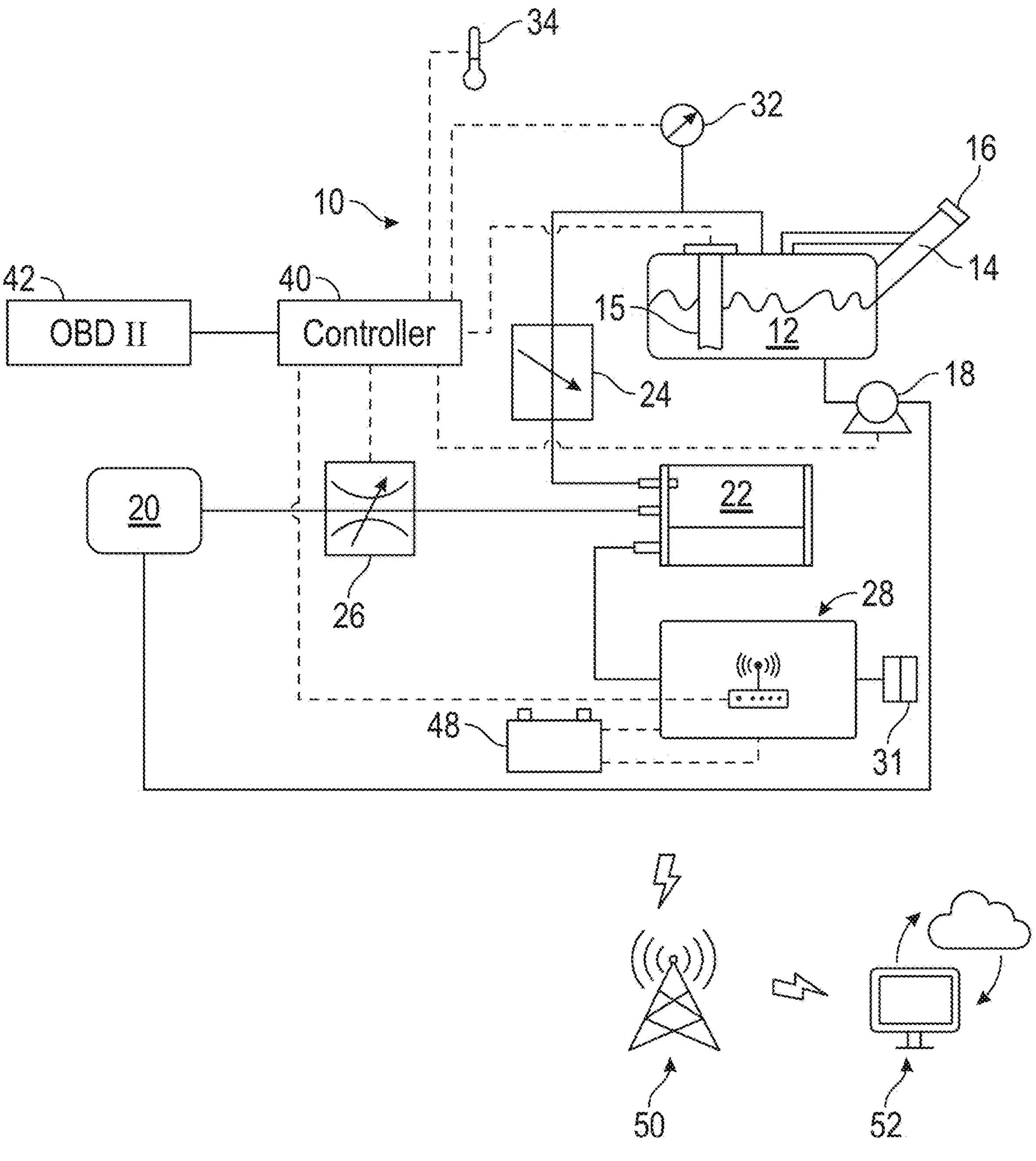
FIG. 1 schematically illustrates portions of one example evaporative fuel system.

FIG. 1 schematically illustrates a portion of an example evaporative fuel system 10 of CN IV and CN V vehicles. It should be understood that other types of systems may be used. The system 10 includes a fuel tank 12 having a fuel filler 14 with a fill cap 16. A fuel pump 18 supplies gasoline, for example, from the fuel tank 12 to an internal combustion engine 20, which provides propulsion to a vehicle. A fuel level sensor 15 is in communication with a controller 40, which may be an engine controller, and measures a level of fuel within the fuel tank 12.

The system 10 is configured to capture and regulate the flow of fuel vapors within the system. In one example type of system (e.g. those used in hybrid vehicles), a fuel tank isolation valve (FTIV) 24 is arranged fluidly between the fuel tank 12 and a charcoal canister 22, which captures and stores fuel vapors for later use by the engine 20. A purge valve 26 is fluidly connected between the canister 22 and the engine 20. In one example, the controller 40 regulates a position of the purge valve 26 during engine operation in response to a purge command from the engine controller 40, for example, to selectively provide the fuel vapors to the engine 20 during fuel combustion to make use of these fuel vapors. The LDM 28 may also have its own controller separate and discrete from the engine controller 40.

Regarding the evaporative emissions system, the integrity of the system 10 must be periodically tested to ensure no fuel vapor leakage. One type of system 10 uses a leak detection module (LDM) 28 (also referred to as a "leak check module"), which can be used to pull a vacuum and/or pressurize the system to determine whether a leak exists, for example, using a pressure transducer (e.g., within the LDM 28). In one example leak test procedure, the purge valve 26 is closed and the leak detection module 28 is used to evacuate or pressurize the system. Another pressure transducer 54 may be used to monitor the pressure of fuel vapors within the fuel tank 12 during other conditions. In one example, a temperature sensor 34 is arranged outside the LDM 28. The temperature sensor 34 may be useful for quantify heat transfer characteristics of the fuel vapor within the fuel tank 12 relative to surrounding atmospheric temperature.

A modified LDM 28 is installed in the system 10. The working power supply of the LDM 28 is provided by a vehicle power supply 48. The result data of the LDM 28 passes through the communication base station 50, which uploads to cloud storage data center 52. The disclosed inventive LDM 28 can be independently installed on CN IV and CN V vehicles to conduct leakage inspections of the fuel evaporation control system and excessive HC compound emission inspections from the carbon canisters 28. At the same time, results can be uploaded to the data center. The disclosed LDM 28 has the ability to independently monitor the status of the vehicle's fuel evaporation control system, independently start the diagnostic process, and independently determine whether it is leaking or exceeding the standard.

Figure 2:
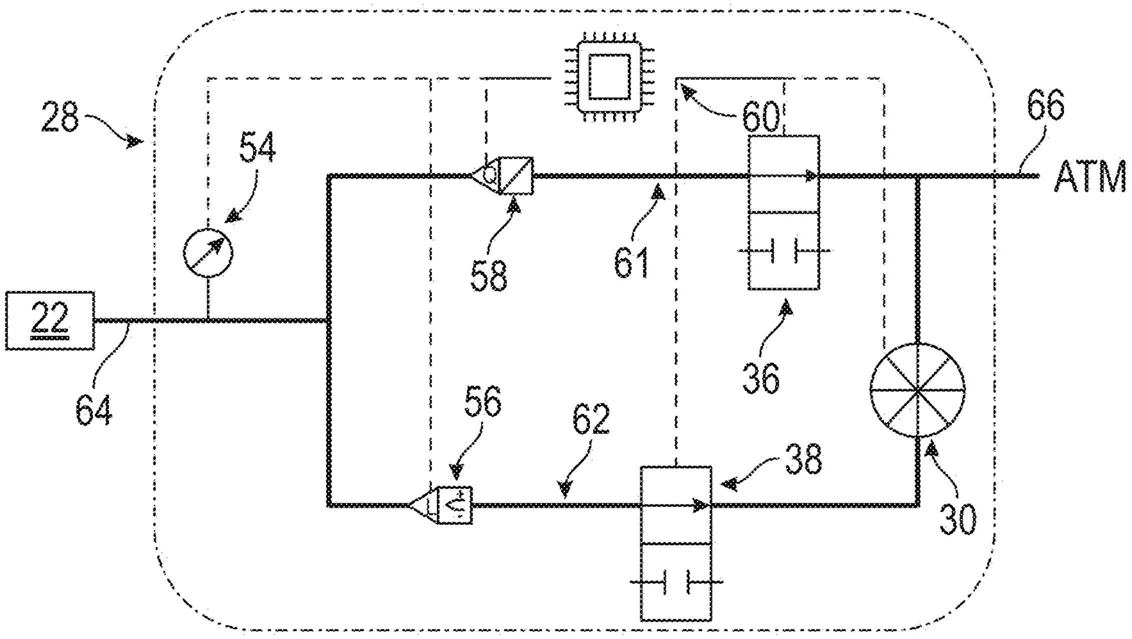
FIG. 2 is a schematic view of the LDM in FIG. 1 with in a non-operational state.
Figure 3:
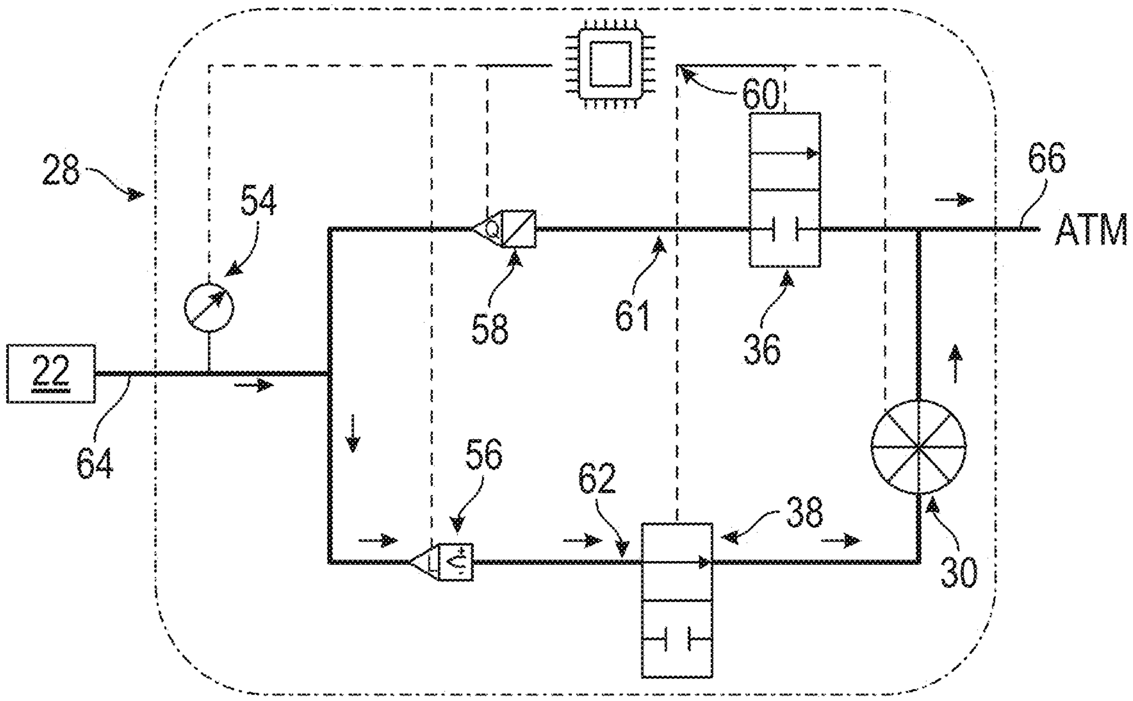
FIG. 3 is a schematic view of the LDM in FIG. 1 with in a vacuum mode during a testing state.
Figure 4:
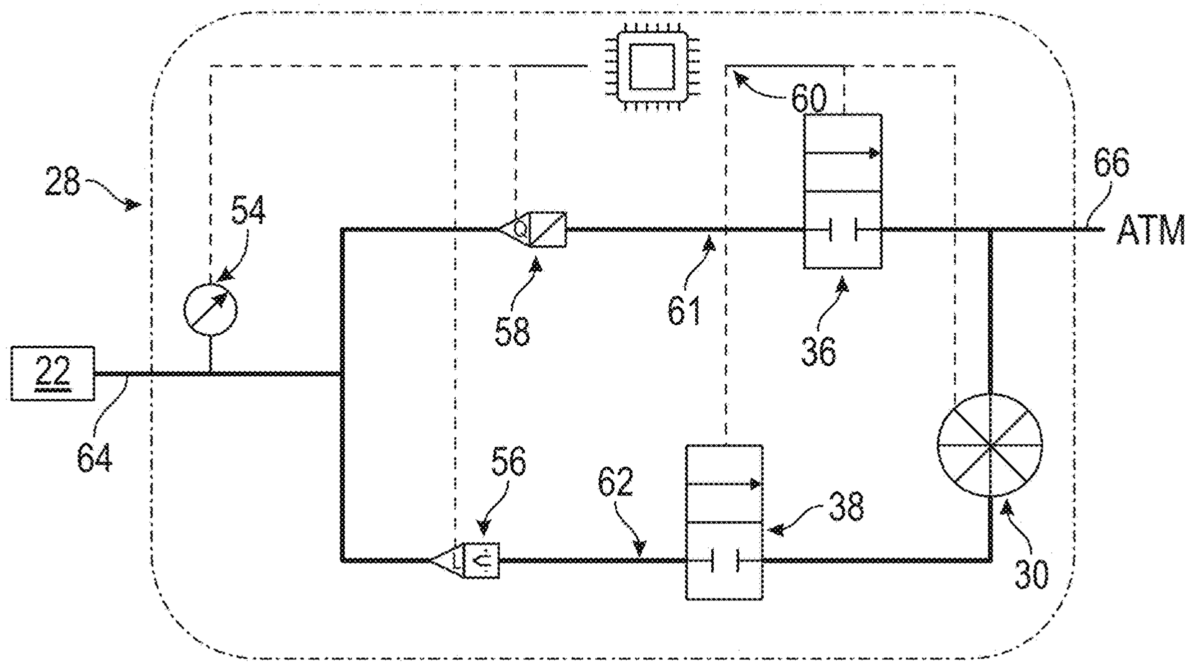
FIG. 4 is a schematic view of the LDM in FIG. 1 with in a pressure-hold mode during the testing state.

A disclosed example LDM 28 is shown in FIGS. 2-4. The LDM 28 includes a pump 30 (e.g., a vane pump) rotationally driven by an electric motor and arranged in a common housing 46, which is typically provided by a multi-piece plastic structure. The housing 46 typically has two fluid connections or openings: a charcoal canister port 64 fluidly connected to the charcoal canister 22, and an atmospheric port 66 in fluid communication with the atmosphere. A filter 31 (FIG. 1) may be arranged between the atmosphere and the pump 30 to prevent debris from entering the LDM 28.

Some customers prefer a system that operates using a vacuum, while other customers prefer a system that is pressurized. The rotational direction of the pump 30 determines whether the system is pressurized or a vacuum is applied. So, to provide a pressurized evaporative emissions system test, the pump 30 will draw air from the atmospheric port 66 direct the atmospheric air towards the charcoal canister 22. To provide a depressurized or negative pressure evaporative emissions system test (i.e., vacuum), the pump 30 will draw air from the charcoal canister 22 and out to the atmosphere through the atmospheric port 66.

A canister valve solenoid (CVS) CVS 36 is arranged in fluid communication along a first fluid passageway 61 fluidly connected between the canister and atmospheric ports 64, 66. A second fluid passageway 62 also fluidly connects the canister and atmospheric ports 64, 66. The pump 30 is arranged in fluid communication along the second fluid passageway 62 between the first and second ports 64, 66. A CVS check valve 38 is arranged in the second fluid passageway 62 and selectively blocks the canister 22 from the pump 30 and atmosphere via the second port 66.

Generally, when the LDM 28 is not performing a leak check of the fuel system 10, the CVS 36 and the CVS check valve 38, which are arranged in the housing 46, are in an open position to allow air to pass between the charcoal canister port 64 and the atmospheric port 66. This enables the system 10 to draw air from the atmosphere (e.g., during vapor purge) or expel air to the atmosphere (e.g., during refueling), as needed. In the example, the first and second solenoid valves 36, 38 are 2-position valves having open and closed positions, and are normally open when the solenoid valves are de-energized. When the LDM 28 is performing a leak test of the of the fuel system 10, the CVS 36 is in a closed position, and the CVS check valve 38 remains in the open position. Once the desired system pressure is reached, both the CVS 36 and CVS check valve 38 are closed. The pressure transducer 32 is arranged to read the pressure in the system.

The disclosed LDM 28 has two functional aspects. First, the LDM 28 is operable to detect leaks in the evaporative emissions system 10, which is typical function of such a device. Second, the LDM 28 is also designed to determine the overall functionality of the emissions system itself and its effectiveness in mitigating undesired emissions (e.g., volatile organic compounds (VOCs)). To that end, the disclosed LDM 28 additionally includes a pressure sensor 54, a VOC gas sensor 56, a mass flow sensor 58, and a controller 60. The VOC gas sensor 56 can measure the concentration of hydrocarbons (HC). The mass flow sensor 58 is a bidirectional mass flow meter and can sense the direction of air flow. The controller 60 includes data processing, device control, and wireless data transmission functions.

Regarding the leak detection function, the LDM 28 includes three operational states including first state corresponding to a non-operational state in which both the first and second solenoid valves 36, 38 are open (FIG. 2). In the example, the CVS 36 and CVS check valve 38 are 2-position valves having open and closed positions, and are spring-biased normally open when the solenoid valves are de-energized. This enables the system 10 to draw air from the atmosphere (e.g., during vapor purge) or expel air to the atmosphere (e.g., during refueling), as needed. No leak check is actively performed in this state.

In a second state (a pressure mode during a testing state), when the LDM 28 receives a leakage diagnosis request, the timer of the controller 60 records that T0 time has passed since the last diagnosis. Once the conditions for re-diagnosis are verified as being satisfied, the LDM 28 starts the leakage diagnosis. The first solenoid valve 36 is closed and the second solenoid valve 38 is open (FIG. 3). In this second state, the pump 30 is configured to move fluid between the canister and atmospheric ports 64, 66 to evacuate the air from the fuel system 10.

A third state (FIG. 4) corresponds to a pressure-hold mode during the testing state in which the pressure sensor 54 (and/or pressure sensor 32) detects the relative pressure in the system 10. When the pressure in the system reaches the target threshold P0 (for example, −3 kPa), the controller 60 turns off the pump 30. Both the first and second solenoid valves 36, 38 are then closed, sealing off the system 10. The internal pressure of the system is monitored for leaks. The pressure sensor 54 (and/or pressure sensor 32) monitors the relationship curve of the established system negative pressure vacuum P1 with time T1. The controller 60 determines the leakage of the system through an algorithm and generates a result code. An OBDII system 42 communicates and/or is integrated with the engine controller 40 and uses the pressure information to generate engine malfunction codes that may be stored and for illuminating a "check engine" light on the vehicle instrument panel indicating vehicle service is needed. After the leakage diagnosis is completed, the controller 60 de-energizes the CVS 36 and CVS check valve 38 to return them to the open positions. At the same time, the controller 60 uploads the diagnosis results to the data center 52 via the communication base station 50 for storage.

Figure 5:
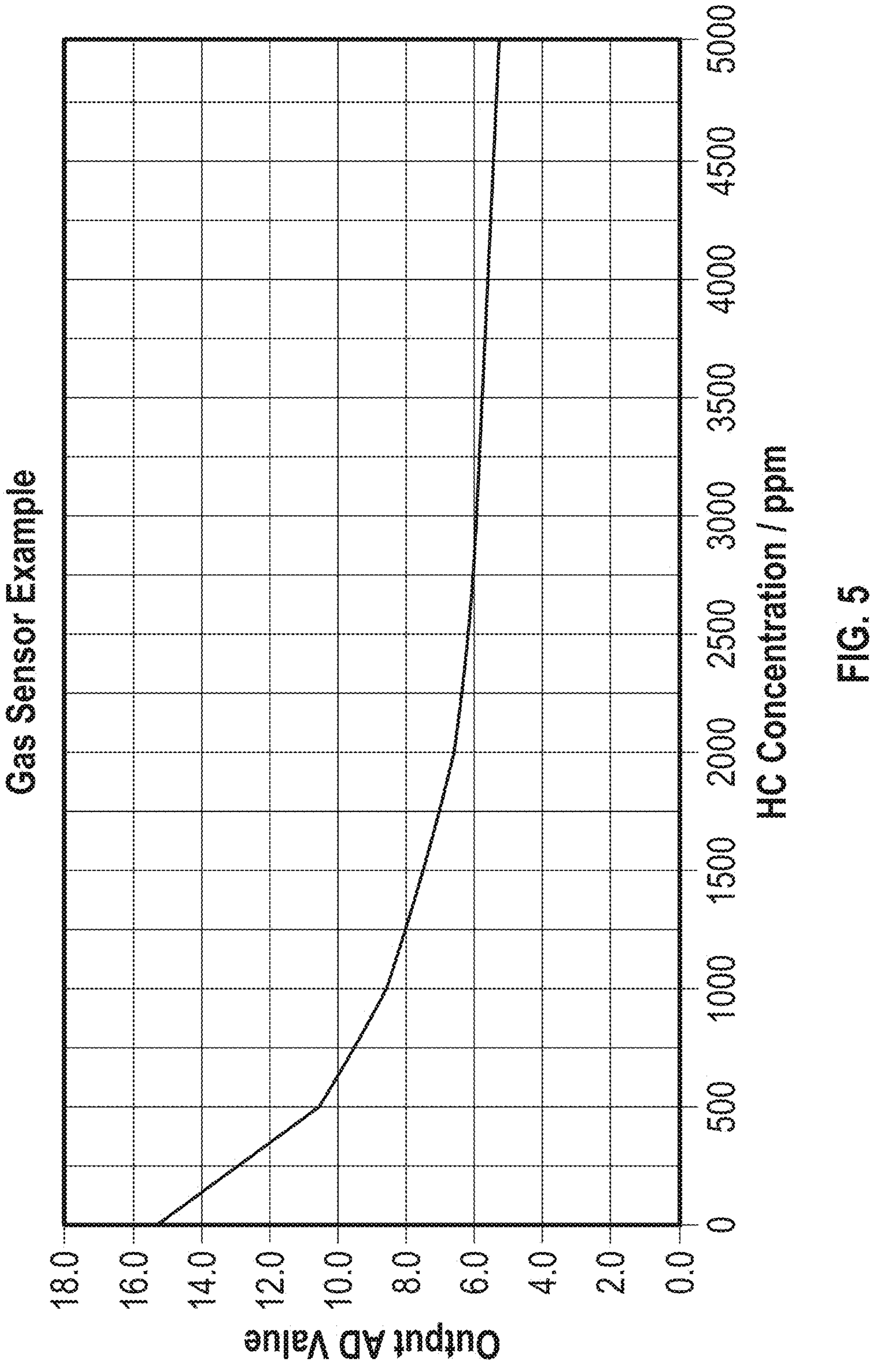
FIG. 5 is an example graph of hydrocarbon concentration based upon a voltage from a sensor in the LDM.

The LDM 28 evaluates the quality of emissions by obtaining the flow signal from the carbon canister port 64 to the atmosphere port 66 through the flow sensor 58 during an emissions discharge. The controller 60 records the time from the last flow signal to the current time, and determines that the carbon canister desorption has been completed and the standby time has been met. Next, the VOC gas sensor 56 detects the ppm concentration value of HC compounds escaping through the charcoal canister 22 during T2, and converts it into an AD output signal (in volts) to the controller 60. An example graph of such values is shown in FIG. 5. The controller 60 compares the measured value of the HC compound concentration with the threshold value, determines whether it exceeds the standard, and generate a result code. The controller 60 then uploads the diagnosis results to the data center 52 via the communication base station 50 for storage.

The controller 40, controller 60 and OBDII system 42 may be integrated or separate. In terms of hardware architecture, such the controllers can include a processor, memory, and one or more input and/or output (I/O) device interface(s) that are communicatively coupled via a local interface. The local interface can include, for example but not limited to, one or more buses and/or other wired (e.g., CAN, LIN and/or LAN) or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controllers may be a hardware device for executing software, particularly software stored in memory. The processor can be a custom made or commercially available processor, a central processing unit (CPU), an auxiliary processor among several processors associated with the controllers, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, etc.). Moreover, the memory may incorporate electronic, magnetic, optical, and/or other types of storage media. The memory can also have a distributed architecture, where various components are situated remotely from one another, but can be accessed by the controller.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

When the controllers are in operation, its processor can be configured to execute software stored within the memory, to communicate data to and from the memory, and to generally control operations of the computing device pursuant to the software. Software in memory, in whole or in part, is read by the processor, perhaps buffered within the processor, and then executed.

Through the combination of pressure sensor 54, VOC gas sensor 56, mass flow sensor 58, controller 60, in addition to the commonly used normally open CVS 36, normally open CVS check valve 38, and pump 30, the existing CN IV and CN V vehicles can be monitored. The fuel evaporation system 10 performs leakage diagnosis and HC emission diagnosis. The built-in controller 60 of the LDM 28 can independently monitor the status of the vehicle's fuel evaporation control system, independently start the diagnostic process, independently determine whether there is leakage or exceed the standard, and upload the determination results to a remote data center.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples. For example, the disclosed pump may be used in applications other than vehicle evaporative systems.

Although an example embodiment has been disclosed, a worker of ordinary skill in this art would recognize that certain modifications would come within the scope of the claims. For that reason, the following claims should be studied to determine their true scope and content.

What is claimed is:

1. A leak detection module (LDM) comprising:

a housing;

a canister valve solenoid (CVS) arranged within the housing and in fluid communication along a first fluid passageway between a canister port and an atmospheric port, the CVS movable between open and closed positions;

a second fluid passageway in parallel with the first fluid passageway and fluidly connected to the canister port and atmospheric port;

a pump arranged in the second fluid passageway;

a CVS check valve arranged in the second fluid passageway fluidly and movable between open and closed positions;

a pressure sensor in fluid communication with the canister port;

a volatile organic compound (VOC) gas sensor arranged in one of the first and second fluid passageways and configured to measure the concentration of hydrocarbons (HC) therethrough;

a mass flow meter arranged in one of the first and second fluid passageways to determine a mass flow rate from the canister port to the atmospheric port; and a controller arranged in the housing and in communication with the pump, the CVS, the CVS check valve, the pressure sensor, the VOC gas sensor, the mass flow meter, the controller configured to run a leak detection procedure using the pump and operating the CVS and the CVS check valve between the open and closed positions and monitor a pressure within the LDM with the pressure sensor, and the controller configured to determine a quality of emissions by monitoring the concentration of HC and communicate a result.

2. The LDM of claim 1, wherein the CVS and the CVS check valve are 2-position valves having open and closed positions, wherein the leak detection procedure includes three operational states, comprising:

a non-operational state in which both the CVS and the CVS check valve are open;

a pressure mode during a testing state in which the CVS is closed and the CVS check valve is open, the CVS fluidly blocking the fluid flow between the canister port and the atmospheric port, and the pump is configured to move fluid between the canister port and atmospheric port; and a pressure-hold mode during the testing state in which the both the CVS and CVS check valve are closed.

3. The LDM of claim 1, wherein the controller determines the quality of emissions by obtaining a mass flow rate signal from the canister port to the atmospheric port during an emissions discharge, recording a time from the last mass flow rate signal to the current time and determines that a carbon canister desorption has been completed and a standby time has been met, detecting the HC parts per million (ppm) concentration value escaping through the canister port during a second time after the standby time, and comparing the HC ppm concentration value with a threshold value to determine whether the HC ppm concentration value exceeds a standard in order to provide the result.

4. The LDM of claim 3, wherein the controller is configured to wirelessly upload the result to a data center via a base station for storage.

5. An evaporative emissions system comprising the LDM of claim 1, the system comprising:

an engine configured to provide vehicle propulsion;

a fuel tank containing fuel and fuel vapors that are selectively supplied to the engine;

a charcoal canister that stores the fuel vapors from the fuel tank, the canister port in fluid communication with the charcoal canister;

a fuel tank isolation valve fluidly provided between fuel tank and the charcoal canister;

a purge valve in fluid communication with the charcoal canister and configured to selectively provide the fuel vapors to the engine in response to a purge command.

* * * * *